United States Patent [19]

Charles

[11] 4,193,740
[45] Mar. 18, 1980

[54] VIBRATION ISOLATOR FOR FLEXIBLE BLADED FAN

[75] Inventor: Herbert N. Charles, Chatham, Canada

[73] Assignee: Fram Corporation, East Providence, R.I.

[21] Appl. No.: 886,676

[22] Filed: Mar. 15, 1978

[51] Int. Cl.² .................. F16D 3/64; F16D 3/14; F04D 29/20
[52] U.S. Cl. ................... 416/132 A; 64/27 NM; 64/11 R; 64/11 F; 416/134 R
[58] Field of Search ......... 64/14, 11 R, 11 F, 27 NM, 64/4

[56] References Cited

U.S. PATENT DOCUMENTS

| | | | |
|---|---|---|---|
| 1,780,727 | 11/1930 | Tenney | 64/14 |
| 2,220,622 | 11/1940 | Homer | 64/14 |
| 2,622,418 | 12/1952 | Howison | 64/11 F |
| 2,892,646 | 6/1959 | Doble | 64/27 NM |
| 3,084,852 | 4/1963 | Seavey | 64/14 |
| 3,824,807 | 7/1974 | Hecht | 64/4 |
| 3,839,883 | 10/1974 | Braess | 64/11 R |
| 3,848,431 | 11/1974 | Takahashi | 64/27 NM |
| 3,910,068 | 10/1975 | O'Connor | 64/27 NM |

Primary Examiner—Charles J. Myhre
Assistant Examiner—R. C. Turner

[57] ABSTRACT

The combination with a flexible bladed fan of a vibration isolator coaxially attached to the fan. The isolator comprises a first rigid support attached to the fan, a second rigid support adapted for connection to the fan driver, and a resilient member intermediate and arranged to transmit torque between the first and second supports while dampening vibrations. The second support includes means for aligning the isolator coaxially with the fan and fan driver and the first and second supports are positioned coaxially with respect to each other.

8 Claims, 5 Drawing Figures

VIBRATION ISOLATOR FOR FLEXIBLE BLADED FAN

FIELD OF THE INVENTION

This invention relates to automative cooling fans and more particularly to fans having flexible blades which decamber with increasing rotational speed.

BACKGROUND OF THE INVENTION

As such fans have been designed, the blades are relatively wide, to provide adequate air flow at low speed, but the blade material is extremely thin, e.g., 0.015 inch, to permit rapid deflection of the blades at higher speeds to minimize power consumption and noise when air flow requirements are met in large measure by vehicle motion. Unfortunately, the natural frequency of such blades sometimes falls close to or within the firing frequency range of an engine at idle, resulting in blade vibration of substantial amplitude. Under some circumstances this vibration can lead to fatigue and premature failure of the fan blades.

The vibration problem can be met by using heavier blade material and/or by reducing the blade width to increase the blades natural frequency. This expedient, however, results in a sacrifice of desirable blade deflection characteristics at high speed in a flexible blade fan.

It has also been suggested, as in U.S. Pat. Nos. 3,525,413 and 4,037,987 and in my prior copending application Ser. No. 843,565, filed Oct. 19, 1977, that the vibration problem be met by raising the blade natural frequency to a frequency which is above the normal idle speed of the engine.

SUMMARY OF THE INVENTION

The principal object of the present invention is to overcome the vibration problem without sacrificing existing desirable characteristics of flexible fans. Further objects are to dampen vibrations from the engine without sacrificing the concentricity of the axes of the fan and its driver or the relative perpendicularity of the drive axis and the plane in which the fan rotates, and to insure positive axial retention of the fan.

In general, the invention features an isolator and the combination with a fan of an anti-vibration isolator coaxially connected to the fan and comprising a first rigid planar member connected to the fan, a second rigid planar member connected to the fan driver, and a resilient member intermediate and connected to the first and second members for transmitting torque from the driver to the fan while dampening vibrations from the driver. The second member includes means comprising a plurality of tubes extending through openings in the first member for aligning the isolator and fan coaxially with the driver.

DESCRIPTION OF THE PREFERRED EMBODIMENTS

The structure, manufacture and operation of preferred embodiments of the invention are as follows:

Structure

The drawings show preferred embodiments, which are then described:

1. Drawings

2. Description

Figure 1:
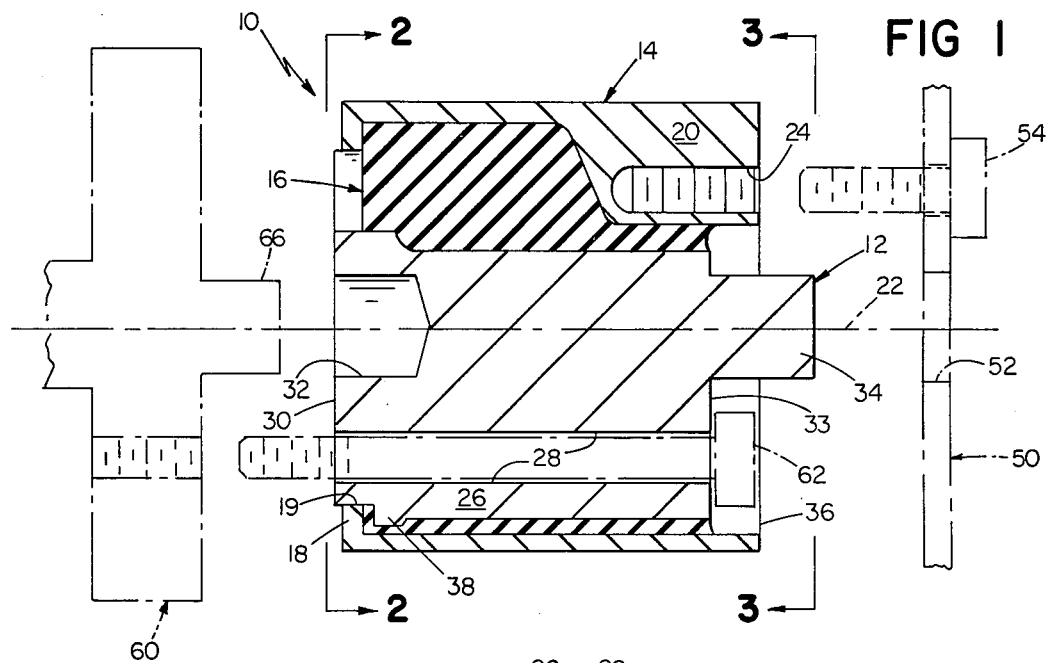
FIG. 1 is a somewhat schematic side view, partially in section taken at 1—1 of FIG. 2, illustrating a first embodiment of the invention.
Figure 4:
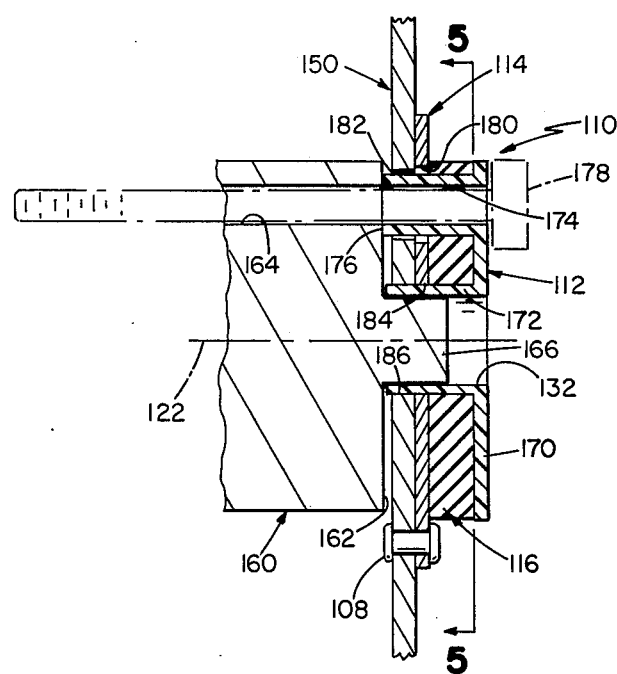
FIG. 4 is a side view, partially in section taken at 4—4 of FIG. 5, illustrating a second embodiment of the invention.

In FIGS. 1 and 4 of the drawings there are shown vibration isolators, generally designated 10, 100, each including a pair of spaced rigid members 12, 14 and 112, 114 respectively, and an intermediate resilient member 16, 116. One of the rigid members of each isolator is connected to the hub 50, 150 of a flexible bladed fan; the other rigid member 12, 112 of each isolator is connected to the fan driver, shown as a water pump 60 or conventional spacer 160.

Figure 2:
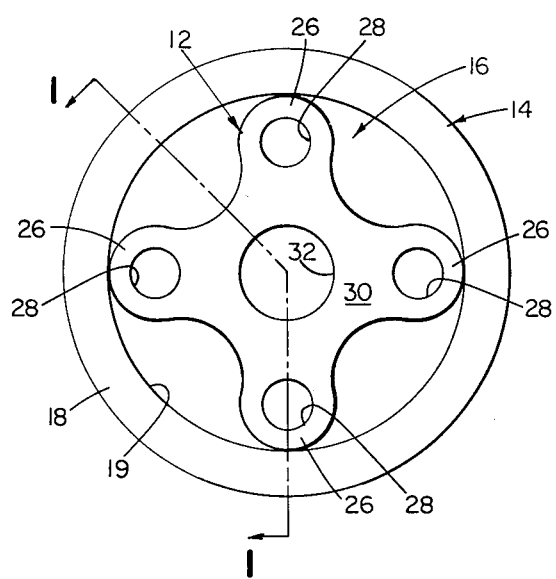
FIG. 2 is an end view taken at 2—2 of FIG. 1.
Figure 3:
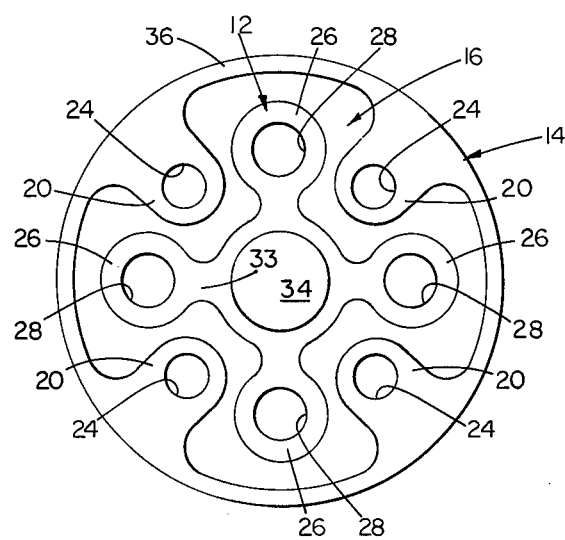
FIG. 3 is an end view taken at 3—3 of FIG. 1.

The embodiment of FIGS. 1-3 is the joint invention of Laurie C. Luckhardt and Herbert N. Charles, such joint invention having been made subsequent to the invention claimed here. FIGS. 1-3 shows an isolator, generally designated 10, including rigid inner and outer shells 12, 14 of cast aluminum and an intermediate member 16 of vulcanized rubber. Outer shell 14 is a hollow cylinder having a radially inwardly projecting annular flange 18 at one end thereof and four radially inwardly projecting fingers or legs 20 at the other end. As shown, legs 20 are spaced at 90 degree intervals; each leg projects radially inwardly about halfway to the central axis 22 of isolator 10, extends axially a little less than half the overall length of shell 14, and defines a threaded fan bolt hole 24 parallel to the common axis 22 of the shell and isolator.

Inner support 12 includes four radially outwardly projecting lobes 26, spaced at 90 degree intervals from each other and extending the length of the shell. As shown, each of lobes 26 is positioned circumferentially intermediate a respective pair of outer shell legs 20 and includes a through bore 28 parallel to axis 20 of isolator 10 and support 12 and having its center on a circle coaxial with axis 22 and passing through the centers of outer shell fan bolt holes 24.

The rear end of support 12 defines a flat alignment surface 30, perpendicular to axis 22 and positioned axially rearwardly of outer shell flange 18. A pilot hole 32 extends coaxially into the end of support 12, perpendicular to surface 30, and a corresponding pilot pin 34 projects coaxially from the front end 33 of the shell. As shown, pin 34 projects beyond the flat front end 36 of outer shell 14, which itself is perpendicular to axis 20 and is positioned beyond the body of inner support 12. The annular edge 19 of flange 18 engages the outer periphery of each of lobes 26, locating the inner and outer shells coaxially with respect to each other. An annular flange 38 of diameter greater than the minimum diameter of outer shell flange 18 projects outwardly from the periphery of the body of inner shell 14 on the side of inside flange 18 towards pilot pin 34.

Rubber intermediate member 16 fills the annulus between the inner and outer shells and is bonded to both. One end of member 16 engages the inside of flange 18 of outer shell 14; the other is approximately coplanar with the front end 33 of the body of inner support 12. But for intermediate member 16, inner and outer shells would be free to rotate with respect to each other, within the limits provided by legs 20 and lobes 26.

Figure 5:
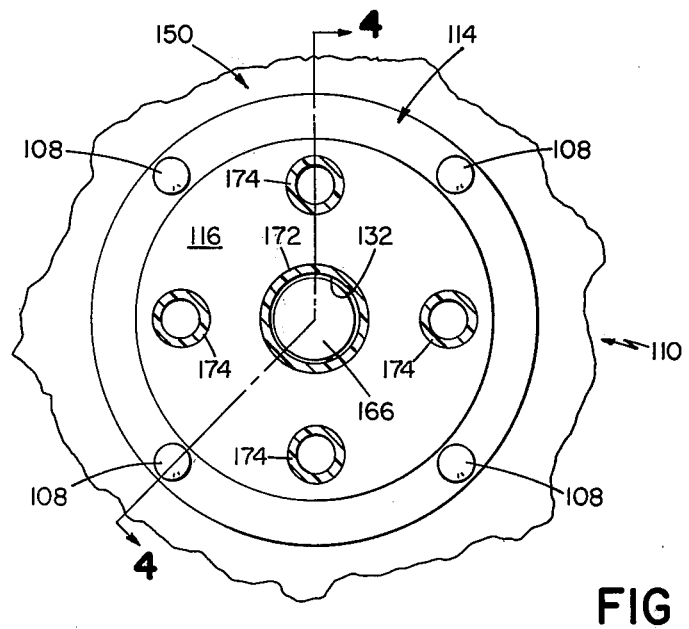
FIG. 5 is a sectional view taken at 5—5 of FIG. 4.

The isolator 110 of the FIG. 4–5 embodiment includes a circular steel disc 114 spot welded coaxially to the front of the hub 150 of a flexible bladed fan, a steel support 112 mounted coaxially on the front of a conventional spacer 160 (itself conventionally coaxially mounted on the water pump) and a resilient rubber pad 116 between and bonded to the disc and support. Support 112 includes a circular disc 170 and five upstanding axial tubes, central tube 172 and four circumferentially spaced bolt tubes 174, each defining at one end thereof a respective hole through disc 170. Bolt tubes 174, all the same length, are spaced at 90 degree intervals around a circle coaxial with disc 170 and central tube 172, and the end 176 of each tube farthest from disc 170 engages the axial face 162 of spacer 160. Bolts 178 through tubes 174 and corresponding aligned bores 164 in spacer 160 fix isolator 110 (and the attached fan hub) perpendicular to the axis 122 of spacer 160 and isolator 110. Central tube 172, which is slightly shorter than tubes 174 and is spaced slightly away from spacer front face 162, provides a pilot hole 132 for receiving the pilot pin 166 of spacer 160 to coaxially align isolator 110 with spacer 160. As will be seen, each of tubes 174 passes coaxially through a pair of aligned holes 180, 182 in disc 114 and fan hub 150; and tube 172 passes through holes 184, 186 which are coaxial with disc 114 and hub 150. Each of holes 180, 182 is slightly larger than the outside diameter of the tube 174 passing therethrough so that the periphery of the tube will be spaced from rather than engaging the sides of the holes. The insides of holes 184, 186 form slip fits with the outside of tube 172.

Manufacture

Isolator 10 and 110 are made using conventional manufacturing techniques. Inside support 12 and outside shell 14 and support 112 are cast and then machined; discs 114 and 170 are punched from a steel sheet and tubes 172, 174 welded in place. The two rigid parts of the respective isolator are then positioned relative to each other as shown in the drawings; and rubber is injected into the space between them and then vulcanized thereby to form the respective resilient intermediate members 16, 116. In making isolator 110, fan hub 150 is then spot welded in place.

Operation

In operation, isolator 10 is substituted for the spacer conventionally used to mount a fan on an engine's water pump 60. The center hole 52 of the fan hub 50 is slipped onto pilot pin 34 and the fan held in place on spacer 10 by fan bolts 54 extending through the fan hub into fan bolt holes 24. End surface 36 of outer shell 14 bears against the back of the fan hub, aligning it in a plane perpendicular to axis 22. Isolator 10 itself is mounted on the front of water pump 60 by bolts 62 through bores 28; and is positioned coaxially relative to water pump 60 by water pump pilot pin 66 which projects into isolator pilot hole 32, and alignment surface 30 which engages the front of the water pump, all together insuring that isolator axis 22 is parallel to the water pump's axis of rotation.

Isolator 110, which is an integral part of the fan, is mounted using a conventional spacer 160 and is held in place by bolts 178. The engaged cylindrical surfaces of tube 172 and pilot pin 166, together with the engagement between ends 176 of tubes 174 and spacer axial face 162, insure that isolator 110 and fan 150 are properly aligned relative to spacer 160.

Torque, from water pump 60 and spacer 160 respectively, is transmitted to the fan through the rubber intermediate member 16, 116. There is no direct torque-transmitting contact between inner and outer shells 12, 14 or (because holes 180, 182 are larger than tubes 174) between support 112 and disc 114; and vibrations from the engine are dampened by the resilient rubber.

As a safety measure, the radial overlap of flanges 18 and 38 of isolator 10, and of disc 114 and support 112 of isolator 110, provide positive axial restraint to preventing the fan from breaking loose.

Other Embodiments

Other embodiments are within the scope of the description and claims. Shells 12, 14 and support 114 could be materials other than cast aluminum; and intermediate members 16, 116 could be any of a large number of resilient materials, such as epoxy or silicone rubber.

What is claimed is:

1. A fan and a vibration isolator in combination, comprising:
   a first generally planar member having a fan attached thereto;
   a second generally planar member adapted for connection to a fan driver;
   a resilient member intermediate and arranged to transmit torque between said first and second planar members; and
   alignment means, comprising a plurality of tubes projecting from one side of said second planar member through aligned openings in said first planar member such that there is no torque-transmitting contact between said tubes and said first planar member, for aligning said isolator and said fan coaxially with said fan driver.

2. The device of claim 1 wherein said plurality of tubes includes a first tube mounted coaxially of said isolator and defining a radially-facing alignment surface of said alignment means, and the others of said tubes are circumferentially spaced at regular intervals around a circle coaxial with said isolator, the ends of said others of said tubes lying in a plane perpendicular to the axis of said isolator and defining axially-facing alignment surfaces of said alignment means and the outer peripheral surfaces of said others of said tubes being spaced from the said aligned openings through which said others of said tubes pass.

3. The device of claim 2 wherein said first tube defines a radially-facing alignment surface engaging a radially-facing surface defined by said first member and coaxially locating said first member relative to said second member.

4. The device of claim 1 wherein said fan, said first member, said resilient member and said second member lie in generally parallel planes perpendicular to and spaced along the axis of said isolator, said fan being on the side of said second member opposite said resilient member.

5. The device claimed in claim 1 in which said fan comprises flexible blades.

6. A vibration isolator for a fan, comprising:
   a first rigid disc adapted for connection to a fan;
   a second rigid disc adapted for connection to a fan driver;
   a plurality of openings provided in said first disc;
   a plurality of tubes aligned with and projecting from said second disc through said openings such that there is no torque transmitting contact between said tubes and said first disc; and a resilient member intermediate and arranged between said first and second discs to transmit torque while dampening vibrations;

a first one of said tubes being coaxial relative to said second disc and defining a radially facing alignment surface engaging a radially facing surface defined by the opening in said first disc through which said first tube projects, said opening being coaxial relative to said first disc, thereby coaxially aligning said first disc relative to said second disc;

the ends of the others of said tubes defining axially facing alignment surfaces adapted for abutment against said driver for maintaining said isolator in a plane perpendicular to the axis of said isolator and said driver.

7. The device of claim 6 wherein the outer surfaces of said others of said tubes are spaced from the aligned openings through which they extend.

8. The device of claim 7 wherein said ends of said others of said tubes lie in a plane perpendicular to the axis of said isolator and said others of said tubes are circumferentially spaced at regular intervals around a circle coaxial with said isolator.

* * * * *